July 24, 1956 — H. L. BOPPEL — 2,755,659
GAUGING DEVICE
Filed July 23, 1953 — 2 Sheets-Sheet 1
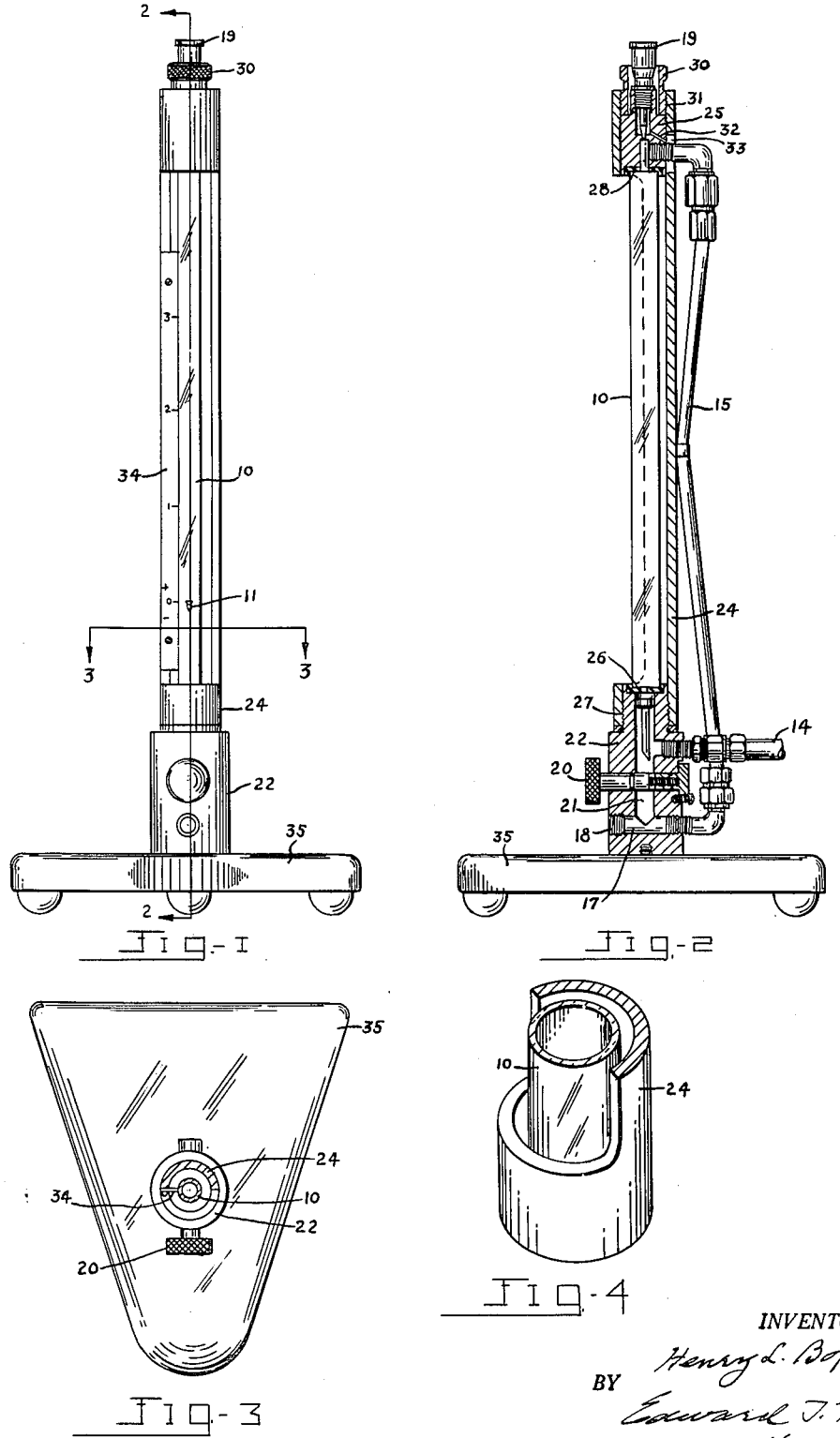
INVENTOR.
Henry L. Boppel
BY Edward J. Nolan
atty

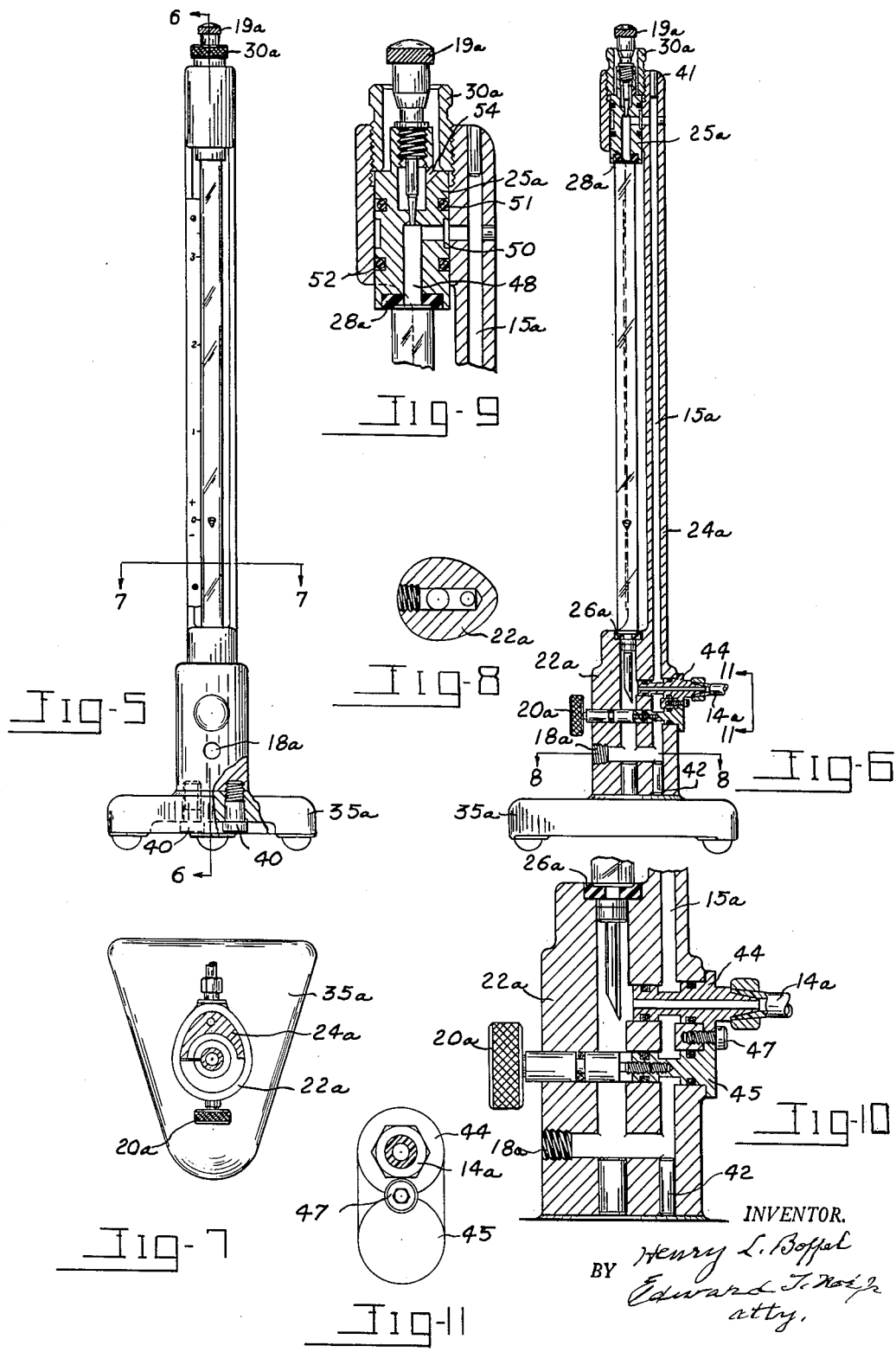

United States Patent Office 2,755,659
Patented July 24, 1956

2,755,659

GAUGING DEVICE

Henry L. Boppel, Dayton, Ohio, assignor to The Sheffield Corporation, Dayton, Ohio, a corporation of Ohio Application July 23, 1953, Serial No. 369,777

5 Claims. (Cl. 73—37.5)

This invention relates to the field of gauges using controlled fluid flow for measurements of dimensions or the like, and is principally directed to improved casing and supporting means for such gauges.

One of the major types of gauges using controlled air flow for determining product characteristics involves the use of a vertically disposed transparent flow tube having an internal taper along which a float element positions itself in accordance with the velocity of air flowing through the tube as controlled by the product characteristic. Previously developed casings and supports for such tubes have not been as compact in dimension and as simple in construction as is desirable. Compactness is a desirable feature because it makes a gauge more universally applicable at the machine where products are being produced and in other situations of limited space. Simplicity of construction makes it possible to produce a gauge which is more rugged and which is cheaper to manufacture.

It is accordingly the principal object of this invention to provide a gauge comprising casing and support means for a flow tube of the type referred to above which is quite compact, simple, and rugged in construction.

It is a further object to provide a gauge comprising a casing and support for a gauge flow tube with major dimensions comparable to those of the flow tube itself.

Other objects and advantages of the invention will be apparent from the following description, the appended claims, and the accompanying drawings, in which, Figure 1 is a front elevation of one embodiment of the present invention, Figure 2 is a sectional view along line 2—2 of Figure 1, Figure 3 is a sectional view along line 3—3 of Figure 1 also disclosing the triangular shaped lower member of the gauge, Figure 4 is a perspective view, enlarged, of the association of the lower tube end and the tube supporting member in the embodiment of Figure 1, Figure 5 is a front elevation of another embodiment of the present invention, Figure 6 is a sectional view along line 6—6 of Figure 5, Figure 7 is a sectional view along line 7—7 of Figure 5, Figure 8 is a sectional view on line 8—8 of Figure 6, Figure 9 is an enlarged portion of the section of Figure 6 showing the assembly at the upper end of the gauge, Figure 10 is an enlarged view of the lower end of the section of Figure 6, and Figure 11 is a detailed view on line 11—11 of Figure 6.

In the exemplary embodiment illustrated in Figures 1–4 the flow tube is indicated at 10. It has an internal tapered passage and a float element 11 positions itself along the flow tube in accordance with the velocity of flow therethrough. Air is supplied under regulated pressure through a connection 14, flows upward through the flow tube and down through a flexible conduit 15 to a lower passage 17 and to a connection 18 adapted for connection to a gauging device where the air flow is controlled in accordance with a product characteristic or dimension. In order to position the float 11 along the length of the flow tube 10 as desired in setup operations an adjustment is provided at 19, controlling a bleed to atmosphere. An amplification adjustment 20 is preferably provided to control the proportion of air supplied through the connection 14 which passes through a bypass passage 21 to the lower passage 17 and directly to the gauging device without passing through the flow tube.

The flow tube 10 is supported by three major components in the disclosed embodiment of Figures 1–4. These components comprise a base portion 22, a separate integral supporting member 24, and a tube cap or clamping means 25. The base portion 22 includes the supply connection, the bypass passage 21 and the lower passage 17 leading to the gauging device as well as the amplification adjustment 20 and its associated structure. A seating means 26 for the lower end of the flow tube 10 is provided in the upper surface of the base portion 22 or is otherwise carried adjacent the lower end of the integral supporting member 24.

The supporting member 24 is formed in this embodiment from a tube which is internally threaded at its upper and lower ends and which has its central section cut away to a semicircular or substantially C-shaped sectional form. The member 24 extends along the length of the flow tube and generally along the sides and the rear thereof, with clearance. The tube cap or clamping means 25 is carried by the upper section of the member 24 and includes a seating means in its lower surface as indicated at 28. This upper seating means 28 cooperates with the lower seating means 26 to clamp the tube in the gauge. An adjustable clamping means 30 is threaded into the upper section of the supporting member 24 at 31 and is provided to urge the tube cap 25 downward to firmly fix the tube in the gauge. The relief adjustment 19 is threaded into the tube cap 25. It has an inner needles valve controlling the flow of air to atmosphere through a passage 32 and a slot 33 through the supporting member 24. The slot 33 also allows vertical movement of the upper connection to the tube 15 when the flow tube is released or clamped. The tube 15 is flexible in this embodiment and of sufficient length to allow this movement to take place without being uncoupled.

A scale 34 is fastened along one edge of the intermediate section of the supporting member 24 and is calibrated as desired for the gauging operation being performed. Adjustable indicators can also be supported along the scale 34 to mark the tolerance limits of a dimension gauging operation if desired.

The base portion 22 of the gauge illustrated is mounted on a triangular member 35 having lower rubber bumpers thereon. It should be understood however that this lower member 35 is only an example of a suitable mount and that the flow tube supporting components could be carried from a bracket mounted on the particular machine whose products are being gauged or by other mounting means for any particular application involved.

The tube 10 is inserted and removed laterally from the gauge. When the adjustment 30 is released the tube can be raised slightly and its lower end pulled outward and then the tube can be fully removed for cleaning or replacement by a tube of a different internal taper and amplification.

The tube 10 is clamped in the gauge by the relative movement of the seating means 26 and 28 toward one another. It is not otherwise supported and the supporting member 24 has clearance relative thereto along its intermediate section. The interior of the supporting member 24 section which extends along the length of the tube 10 can be painted with some reflecting paint, or white, in order to concentrate light along the length of the tube to more clearly disclose the position of the float 11.

Figures 5 to 11 illustrate another embodiment of the gauge of this invention. It differs basically from the embodiment illustrated in Figures 1 to 4 in that the major flow tube supporting components and air flow passages are formed integrally in a single elongated member, as by casting. In describing this embodiment wherever components correspond directly with those of the other embodiment, the same numeral has been utilized with a suffix "a."

It will be seen from Figures 5 and 6 that the supporting member 24a is formed integrally with the base portion 22a in this embodiment. This base portion 22a is fixed to the triangular member 35a by means of screws 40, 40 as seen in Figure 5. The integral member which includes the components 22a and 24a is somewhat streamlined or "egg-shaped" in outline as will be apparent from the examination of Figures 7 and 8, is easily cleaned and serves to support and protect the flow tube. The flow tube is partially enclosed and is projected by the intermediate support section which is substantially C-shaped in section and is also substantially coaxial with the flow tube—see Figure 7. The passage 15a in this embodiment is formed integrally by a hole passing vertically through the integral support and plugged at its upper end by a plug 41 and at its lower end by a plug 42. Air is supplied through hose coupling 14a and passes through an insert 44 and to the lower end of the flow tube, see Figure 10. The inner end of the amplification adjustment 20a is threaded into another insert 45. Note that each of these inserts 44 and 45 include reduced portions along their length which allows air flowing down through the passage 15a from the upper end of the flow tube to continue its flow around these inserts and to the connection 18a for the gauging device.

As seen in Figures 10 and 11 each of these inserts 44 and 45 have a notch in its outer edge which notches are situated in opposing relationship and a screw 47 is threaded into the tube supporting casing through these opposing notches thus fixing the inserts 44 and 45 in position and against rotation. Suitable sealing rings are provided at each end of the inserts 44 and 45 cooperating with the walls of the passages in which they are carried.

The lower end of the flow tube is seated at 26a in the lower base portion 22a and the upper end of the flow tube is seated at 28a in the lower surface of the tube cap 25a. This tube cap 25a is carried for axial sliding to and from the upper end of the flow tube for clamping purposes in the support 24a in its upper section which extends over the flow tube. This upper section and the base portion 22a are generally aligned with the flow tube. The flow tube communicates with the passage 15a through passage 48 and an annular groove 50. The groove 50 is of such a width as to allow vertical adjustments of the tube cap 25 while maintaining communication from the upper end of the flow tube to passage 15a. Sealing rings 51 and 52 are provided at each end of the tube cap 25a to prevent leakage. The relief adjustment 19a is threaded into the upper end of the tube cap 25a and controls the air relieved to atmosphere past the inner needle-like end of the relief adjustment 19a and through an escape passage 54 leading through the upper end of the upper assembly to atmosphere. The tube cap 25a is clamped against the upper end of the flow tube by a manually adjustable clamping means 30a which is threaded into the upper section of the support 24a.

Other features not specifically mentioned in the description of the embodiment of Figures 5 to 11 are the same as those of the other embodiment described.

In the particular form of the invention where an integral tubular member threaded to the base portion is used to support the flow tube it can be fashioned by simply taking a tube of the necessary length, removing an intermediate portion of the tube wall and internally threading the tube at each end. Thus the supporting tube can be formed without any complicated machining, stamping or foundry operations.

Where the fully integral structure is employed with suitable dies such units can be readily and cheaply mass produced.

Thus it is seen that a gauge employing a flow tube has been provided which, as will be apparent from the illustrative embodiments, is extremely simple to manufacture and compact in configuration. No outside housing structure is required and the single compact support has strength and rigidity. It is comprised of an extremely small number of relatively easily fashioned components and assembled simply. It is rugged in construction, gives protection to the indicating flow tube, and is cheap to manufacture.

While the forms of apparatus herein described constitute preferred embodiments of the invention, the invention is not limited to these precise forms of apparatus, and changes may be made therein without departing from the scope of the invention which is defined in the appended claims.

What is claimed is:

1. An air gauge for measurement of air flow as determined by a gauged product characteristic comprising a base forming the sole support for the gauge, an elongated integrally formed member supported from said base and extending vertically thereabove, an internally tapered transparent flow tube, a float element operable in the flow tube in accordance with the rate of fluid flow up the tube, said member comprising a lower section having seating means in the upper surface thereof in which the lower end of the flow tube is seated and from which the flow tube extends vertically, the lower section of the member being smaller in plan outline than the base which extends to each side thereof for stable support of the gauge, said member further comprising an intermediate section of substantially C-shaped horizontal outline for rigidity and of a length greater than that of the flow tube, said intermediate section extending along and partially around the flow tube with clearance at the rear of the gauge, a third member section extending over the upper end of the flow tube, the upper section and upper portion of the lower member section being substantially the same in plan outline and the exterior of the intermediate section forming a smooth continuation therebetween, a vertical passage in the upper section having a threaded upper portion, a tube cap having seating means at its lower end slidable in the lower portion of the upper section passage for projection therebelow into clamping engagement with the upper tube end, clamping means threaded into the threaded portion of the upper section passage for clamping engagement with the tube cap, whereby the tube is releasably clamped for removal laterally and forwardly from the gauge, and passage means through said member and said seating means communicating with the upper and lower ends of the flow tube.

2. An air gauge for measurement of the air flow through a tapered tube as determined by a gauged product characteristic comprising a base forming the sole support for the gauge, an elongated integrally formed tube-carrying member supported from said base and extending vertically thereabove, an internally tapered transparent flow tube, a float element operable in the flow tube in accordance with the rate of fluid flow up the tube, said member comprising a lower section having seating means in the upper surface thereof on which the lower end of the flow tube is seated and from which the flow tube extends vertically, the lower section having a substantially egg-shaped outline in plan smaller than said base, said base extending to each side of said lower section for stable support of the guage, said member further comprising an intermediate section of substantially C-shaped horizontal outline for rigidity and of a length greater than that of the flow tube, said intermediate section extending along the flow tube with clearance at the rear of the gauge, a third member section extending over the upper end of the flow tube, the upper section and upper portion of the lower member section being substantially the same in plan outline and the exterior of the intermediate section forming a smooth continuation therebetween, a vertical passage in the upper section having a threaded upper portion, a tube cap having seating means at its lower end slidable in the lower portion of the upper section passage for projection therebelow into clamping engagement with the upper tube end, clamping means threaded into the threaded portion of the upper section passage for clamping engagement with the tube cap, whereby the tube is releasably clamped for removal laterally and forwardly from the gauge, and passage means through said member and said seating means communicating with the upper and lower ends of the flow tube including connection means for placing the lower end of the flow tube in communication with a source of fluid under controlled pressure and the upper end of the flow tube in communication with a gauging head.

3. An air gauge for measurement of air flow as determined by a gauged product characteristic comprising a base forming the sole support for the gauge, an elongated integrally formed member supported from said base and extending vertically thereabove, an internally tapered transparent flow tube, a float element operable in the flow tube in accordance with the rate of air flow up the tube, said member comprising a lower section having seating means in the upper surface thereof in which the lower end of the flow tube is seated and from which the flow tube extends vertically, said base extending to each side of said lower section for stable support of the gauge, said member further comprising an intermediate section of substantially C-shaped horizontal outline for rigidity and of a length greater than that of the flow tube, said intermediate section extending along and partially around the flow tube with clearance at the rear of the gauge, a third member section extending over the upper end of the flow tube, the upper and lower member sections being substantially the same in plan outline and the exterior of the intermediate section forming a smooth continuation therebetween, a vertical passage in the upper section coaxial with said flow tube, a tube cap having seating means at its lower end, said tube cap being slidably carried in the upper section passage for movement into clamping engagement with the upper tube end, clamping means in the upper section passage for clamping engagement with the tube cap whereby the tube is releasably clamped for removal from the gauge, said vertical member having a passage therein extending vertically at the rear of the gauge beginning within the upper section of the vertical member and extending through the intermediate section into the lower member section, said tube cap and member providing a passage leading from the upper end of said vertical passage to the upper end of the flow tube, connection means at the rear of the gauge adapted for connection to a source of fluid under controlled pressure, connection means at the forward face of the gauge adapted for connection to a gauge head, the lower portion of the gauge having passages therein including a first passage extending between said connection means, a second passage joining said first passage at one point therealong and extending through the lower seating means into communication with the lower end of said flow tube, said vertical passage communicating with said first passage at a point downstream of said one point therealong, and valve means in said first passage between the connections to the second and vertical passages for adjusting the amplification of the gauge.

4. An air gauge for measurement of air flow as determined by a gauged product characteristic comprising a base forming the sole support for the gauge, an elongated integrally formed member supported from said base and extending vertically thereabove, an internally tapered transparent flow tube, a float element operable in the flow tube in accordance with the rate of fluid flow up the tube, said member comprising a lower section having seating means in the upper surface thereof in which the lower end of the flow tube is seated and from which the flow tube extends vertically, said base extending to each side of said lower section for stable support of the gauge, said member further comprising an intermediate section of substantially C-shaped horizontal outline of a length greater than that of the flow tube, said intermediate section extending along and partially around the flow tube with clearance at the rear of the gauge, a third member section extending over the upper end of the flow tube, the upper and lower member sections being substantially the same in plan outline and the exterior of the intermediate section forming a smooth continuation therebetween, a vertical passage in the upper member section coaxial with the flow tube, a tube cap having sealing means at its lower end, said tube being slidably carried in the lower portion of the upper section passage for movement into clamping engagement with the upper tube end, clamping means in the upper section passage for clamping engagement with the tube cap, whereby the tube is releasably clamped for removal from the gauge, said vertical member having a passage formed therein extending vertically at the rear portion of the gauge beginning within the upper member and extending through the intermediate section into the lower member section, said tube cap and member providing a passage leading from the upper end of said vertical passage to the upper end of the flow tube, said lower section having a second vertical passage therein coaxial with the flow tube communicating through the lower seating means with the lower tube end, connection means at the forward face of the lower section adapted for connection to a gauging head, said lower section having a transverse lower passage communicating with both vertical passages at their lower ends and leading to said connection means, said lower section having an upper passage extending horizontally between the vertical passages and opening at the rear of the instrument, tube means inserted in said upper passage in sealed relationship with the walls thereof, said tube means having connection means at the rear end thereof adapted for connection to a source of fluid under regulated pressure whereby the lower end of the flow tube is supplied with fluid, and valve means in the second vertical passage at a point between the upper and lower passages whereby the proportion of fluid bypassed around the flow tube directly to the gauging head can be varied to control the amplification of the gauge.

5. The air gauge of claim 4 wherein the tube means has an annular groove in the outer surface thereof at its intersection with the vertical passage leading from the upper end of the flow tube, the lower section of the elongated member including a third horizontal passage passing from front to rear therethrough between the upper and lower passages and intersecting both vertical passages; the valve means comprising a substantially cylindrical member inserted in said third passage from the rear of the gauge and terminating between the vertical passages in sealed relationship with the walls of the third passage, said cylindrical member having an annular groove in its outer surface at its intersection with the vertical passage leading from the upper end of the flow tube and an internally threaded inner end, a valve stem inserted within said third horizontal passage from the forward face of the instrument including a cylindrical inner end portion operating within the second vertical passages and having a threaded inner end threaded within the insereted cylindrical member, and retaining means cooperating with the inserted cylindrical member to retain it in position and prevent its rotation.

References Cited in the file of this patent

UNITED STATES PATENTS 2,593,957    Aller    Apr. 22, 1952

FOREIGN PATENTS 384,167    France    Mar. 31, 1908